United States Patent
Miller (10) Patent No.: US 6,631,916 B1
(45) Date of Patent: Oct. 14, 2003

(54) GUIDANCE SYSTEM FOR PULL-TYPE EQUIPMENT

(76) Inventor: Merle E. Miller, 122 N. Des Moines St., Odebolt, IA (US) 51458

( * ) Notice: Subject to any disclaimer, the term of this patent is extended or adjusted under 35 U.S.C. 154(b) by 0 days.

(21) Appl. No.: 09/918,118

(22) Filed: Jul. 30, 2001

Related U.S. Application Data (60) Provisional application No. 60/221,647, filed on Jul. 28, 2000.

(51) Int. Cl.[7] ............................................. A01B 59/042
(52) U.S. Cl. ........................ 280/468; 280/472; 172/279; 172/605
(58) Field of Search ................................. 280/467, 468, 280/472; 172/6, 26, 239, 272, 279, 605

(56) References Cited

U.S. PATENT DOCUMENTS

| | | | | |
|---|---|---|---|---|
| 3,899,028 A | * | 8/1975 | Morris et al. ................. | 172/4.5 |
| 4,180,133 A | * | 12/1979 | Collogan et al. .............. | 172/26 |
| 4,637,474 A | * | 1/1987 | Leonard ........................ | 172/7 |
| 5,152,347 A | * | 10/1992 | Miller ............................. | 172/7 |
| 5,255,756 A | * | 10/1993 | Follmer et al. ............. | 180/131 |
| 5,476,147 A | * | 12/1995 | Fixemer ....................... | 172/26 |
| 6,431,576 B1 | * | 8/2002 | Viaud et al. ................ | 280/442 |

* cited by examiner

Primary Examiner—Avraham Lerner
(74) Attorney, Agent, or Firm—Mark E. Brown (57) ABSTRACT

An improved equipment guidance system and assembly is described comprising a top plate in releasable engagement with a drawbar of a towing vehicle, a supplemental or ancillary drawbar pivotable about a forward location and movable to an offset position left or right of center by a pair of pistons, and a bottom plate for attachment to the ancillary drawbar and the top plate. The pistons are controlled by a control box that dictates in concert the extension and retraction of the left and right pistons. A signal from the control box is generated from a plurality of sources. One example of a signal source is a tilt sensor that measures inclination relative to gravity. Another example of a signal source is an automatic "whiskers" crop row sensing wand system. Yet another example of a signal source can be generated manually from an operator of the towing vehicle.

20 Claims, 8 Drawing Sheets

GUIDANCE SYSTEM FOR PULL-TYPE EQUIPMENT

RELATED APPLICATION

This application claims the benefit of U.S. Provisional Application No. 60/221,647, filed Jul. 28, 2000.

BACKGROUND OF THE INVENTION

1. Field of the Invention

The present invention relates to a guidance system for pull-type equipment, and more specifically, to a guidance system capable of adjusting the angle of a vehicle drawbar in connection with an implement as it is pulled across a surface. Furthermore, the guidance system allows an equipment operator an ability to alter the towing path of the implement while on-the-fly to account for gravitational forces acting laterally on the implement as it is towed across a surface having a non-horizontal grade or as may be necessary to avoid obstacles and the like.

2. Background of the Prior Art

Typical pull-type equipment is arranged in a manner such that a towing vehicle provides locomotion to a trailing implement provided to perform various functions. Agricultural pull-type equipment is designed to perform various functions on a field in which crops are planted, grown, and harvested, while other pull-type equipment is designed to perform other functions, such as grading a surface of snow or earth. In the case of agricultural pull-type equipment, it is highly desirable to work the soil or apply chemicals by maneuvering the equipment between rows of crops without disrupting the crops themselves. Row crops grown in fields with a generally flat grade pose little challenge to an operator once the equipment has been properly aligned such that the equipment provides its desired function without disturbing the crops. However, maintaining proper alignment of equipment as it travels through rows of crops becomes increasingly difficult in a field with a non-horizontal grade, such as a hillside, due to the forces of gravity acting on the equipment in a manner such that the trailing elements of the implement in-tow move laterally relative to the forward motion of the implement.

In the case of other pull-type equipment, it is highly desirable to manipulate the path of the implement in addition to that provided through steering the towing vehicle. Not withstanding instances where correction for gravity is the primary consideration, in other circumstances, it is desirable for an equipment operator to manipulate the path of the implement in-tow independent from the towing vehicle. Examples illustrating such circumstances include maneuvering the implement through a gate or opening, maneuvering over or under a viaduct or bridge, and manipulating the relative position of equipment during vehicle-implement connection, disconnection, and storage.

Attachment of an implement to a towing vehicle is commonly accomplished by providing an elongated neck portion of an implement for marriage to a drawbar located at the rear of a towing vehicle. The elongated neck allows the towing vehicle to change directions without interfering or coming into contact with the implement in-tow at a point other than the pivot point at which the vehicle drawbar is connected to the implement.

It is known in the art to provide adjustable drawbars capable of vertical height alteration. It is also known to provide drawbars extended to the rear of a vehicle capable of altering the fixed angular position of the drawbar.

Nevertheless there remains a longstanding need for improvements in adjustable drawbar assemblies. Such improvements result in guidance systems for pull-type equipment which will allow an equipment operator an ability to adjust the offset of the drawbar at an angle while underway. Typically, adjustments are necessary to correct the tendency of a towed implement to slide laterally down a grade when the equipment is moving in a forward direction. Further improvements would provide automatic corrective feedback mechanisms whereby a control module would sense a change in grade and relay a command to the drawbar assembly to correct the tendency of the towed implement to slide laterally down a grade when the equipment is moving in a forward direction. Improvements further still would allow an equipment operator an ability to manually maneuver the towed implement to avoid impact with an object in or near the path of the towed implement or to generally improve operator ability to manipulate the position of the towed implement. Further improvements would provide automatic corrective feedback mechanisms whereby a control module would sense the alignment of crop rows and relay a command to the drawbar assembly to maintain implement alignment with the crop rows. Improvements further still would provide a variety of drawbar signaling and feedback options, including, but not limited to, mechanically-derived input signaling, pendulum-derived input signally, mechanically-derived feedback signaling, ultrasonic-, ultraviolet-, and laser-derived feedback signaling.

SUMMARY OF THE INVENTION

An improved equipment guidance system and assembly is described comprising a drawbar in communication with a drawbar signaling means and in further communication with a drawbar feedback means such that the drawbar is adjustable left or right of center depending on towing vehicle-implement operating conditions and a comparison of the drawbar signal and the feedback signal. According to one aspect of the present invention, the improved guidance system and assembly is an integrated component of the drawbar a towing vehicle. According to another aspect of the present invention, the improved guidance system and assembly comprises a top plate in releasable engagement with a drawbar of a towing vehicle, a supplemental or ancillary drawbar pivotable about a forward location and movable to an offset position left or right of center by a pair of pistons, and a bottom plate for attachment to the ancillary drawbar and the top plate. The pistons are controlled by a control box that dictates in concert the extension and retraction of the left and right pistons. A signal from the control box is generated from a plurality of sources.

One example of a signal source is a tilt sensor that measures inclination relative to gravity. The response of the tilt sensor depends on the magnitude of gravity parallel to the sensor element. The output of the tilt sensor is automatically and constantly conveyed to the control box where a command is sent to electro-hydraulic valves that control the extension and retraction of the left and right pistons to correct for the measured tilt. Another example of a signal source is an automatic crop sensing wand system wherein flexible wires or "whiskers" are used to physically sense the row of crops to provide steering signal that is used to direct the towing vehicle between the rows. Whiskers monitor tractor alignment with row crops through a plurality of sensors the output of which is automatically and constantly conveyed to the control box where a command is sent to electro-hydraulic valves that control the extension and retraction of the left and right pistons to correct for the measured disparity measured by the whiskers. Other examples of signal sources include mechanically-derived input signaling and pendulum-derived input signaling. Yet another example of a signal source can be generated manually from an operator of the towing vehicle. The operator can direct the drawbar left or right by activating a handheld or mounted switch that signals the control box command to send a signal to the electro-hydraulic valves that extend and retract the left and right pistons to manipulate the position of the drawbar accordingly.

According to another aspect of the invention, drawbar feedback means comprises a smart cylinder in electronic feedback communication with the control box. Yet another aspect of the invention comprises a mechanically-derived signal as a feedback means, such as a lever or touch-sensitive wire. Other aspects of the drawbar feedback means comprise photoelectric, ultrasonic-, ultraviolet-, and laser-derived feedback signaling.

According to yet another aspect of the invention, there is provided an equipment guidance system on a towing vehicle for towing an implement comprising:

a drawbar pivotable about a forward location and movable to an offset position left or right of center;

a means for said ancillary drawbar adjustment;

a signaling means for directing ancillary drawbar adjustment;

said ancillary drawbar pivotable to an offset position between a substantially center position and a plurality of positions left of center; and said ancillary drawbar pivotable to an offset position between a substantially center position and a plurality of positions right of center.

According to another aspect of the invention, there is provided for attachment to a drawbar of a towing vehicle an equipment guidance system for towing an implement comprising:

a top plate for releasable engagement of vehicle drawbar;

an ancillary drawbar pivotable about a forward location and movable to an offset position left or right of center;

a means for said ancillary drawbar adjustment;

a signaling means for directing ancillary drawbar adjustment;

a bottom plate for supporting said ancillary drawbar and said top plate;

said ancillary drawbar pivotable to an offset position between a substantially center position and a plurality of positions left of center; and said ancillary drawbar pivotable to an offset position between a substantially center position and a plurality of positions right of center.

Preferably, said means for the ancillary drawbar adjustment comprises a pair of hydraulic cylinders in receptive engagement with the ancillary bar, wherein a first end of each cylinder is attached to said top plate at a position proximal to a forward portion of the assembly on either side of the ancillary bar, and wherein a second end of each cylinder is further attached to said ancillary bar at a position distal to a forward portion of the assembly on either side of the ancillary bar.

According to a another aspect of the invention, there is provided for attachment to a drawbar of a towing vehicle an equipment guidance system for towing an implement comprising:

a top plate for releasable engagement of vehicle drawbar;

an ancillary drawbar pivotable about a forward location and movable to an offset position left or right of center;

a means for said ancillary drawbar adjustment;

a signaling means for directing ancillary drawbar adjustment;

a bottom plate for supporting said ancillary drawbar and said top plate;

said ancillary drawbar pivotable to an offset position between a substantially center position and a plurality of positions left of center; and said ancillary drawbar pivotable to an offset position between a substantially center position and a plurality of positions right of center.

said means for the ancillary drawbar adjustment comprises a pair of hydraulic cylinders in receptive engagement with the ancillary bar, wherein a first end of each cylinder is attached to the top plate at a position proximal to a forward portion of the assembly on either side of the ancillary bar, and wherein a second end of the cylinder is further attached to the ancillary bar at a position distal to a forward portion of the assembly on either side of the ancillary bar; and a means for automatically adjusting said offset position according to a signal source in communication with a drawbar feedback signal.

Preferably, said means for automatically adjusting the offset position according to the grade of the ground on which the implement is being towed comprises a measuring means for measuring the grade level of said ground, wherein said measuring means is in communication with a control means for controlling said hydraulic cylinders acting in concert to adjust the offset of the ancillary drawbar rightward or leftward to adjust the on-the-fly orientation of the implement in-tow.

These and other aspects of the present invention will become apparent to those skilled in the art upon reference to the following specification and drawings.

DETAILED DESCRIPTION OF THE INVENTION

Figure 3:
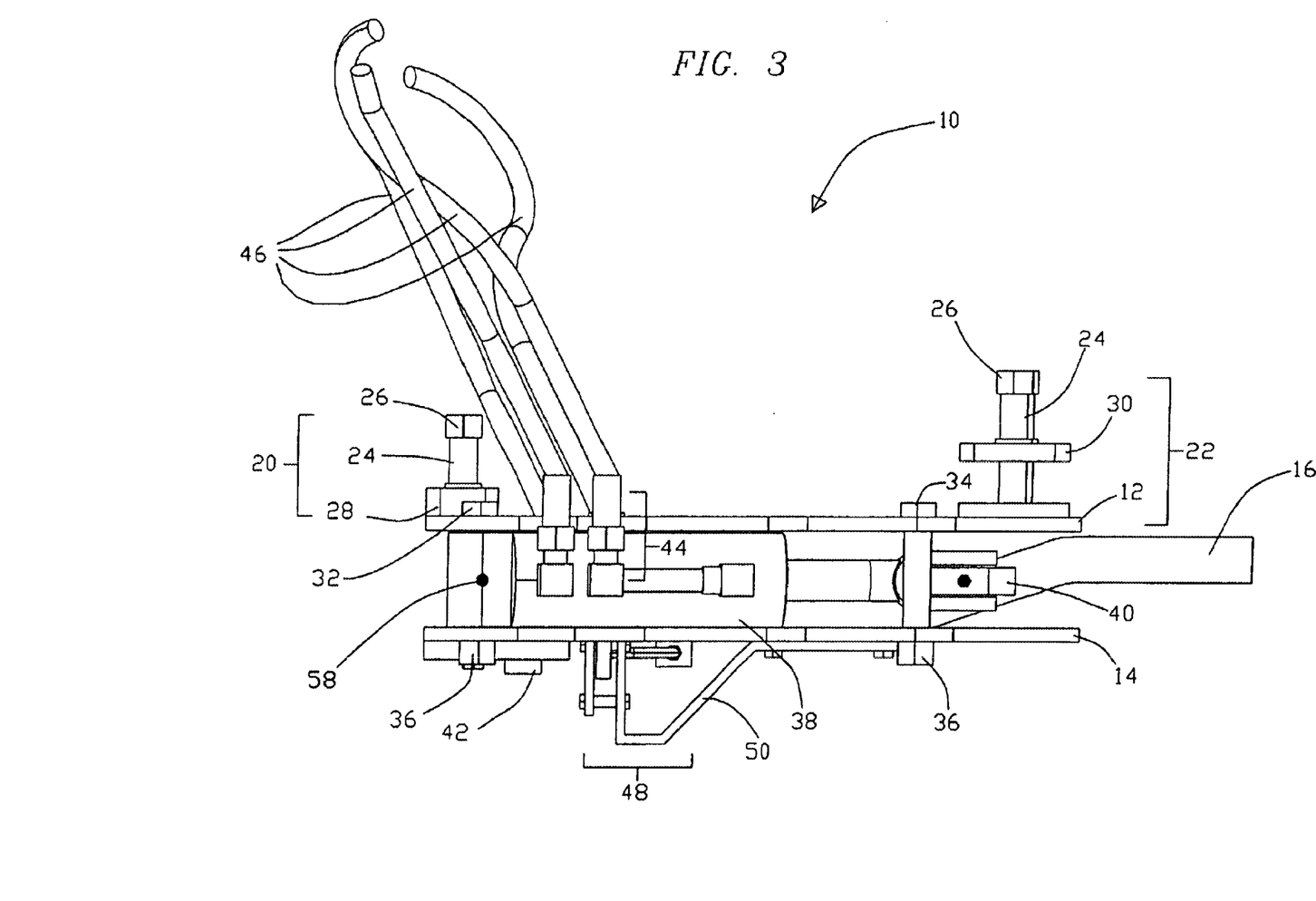
FIG. 3 is a side elevational view as seen generally from line 3—3 in FIG. 1, and with a tractor drawbar shown in phantom.
Figure 4:
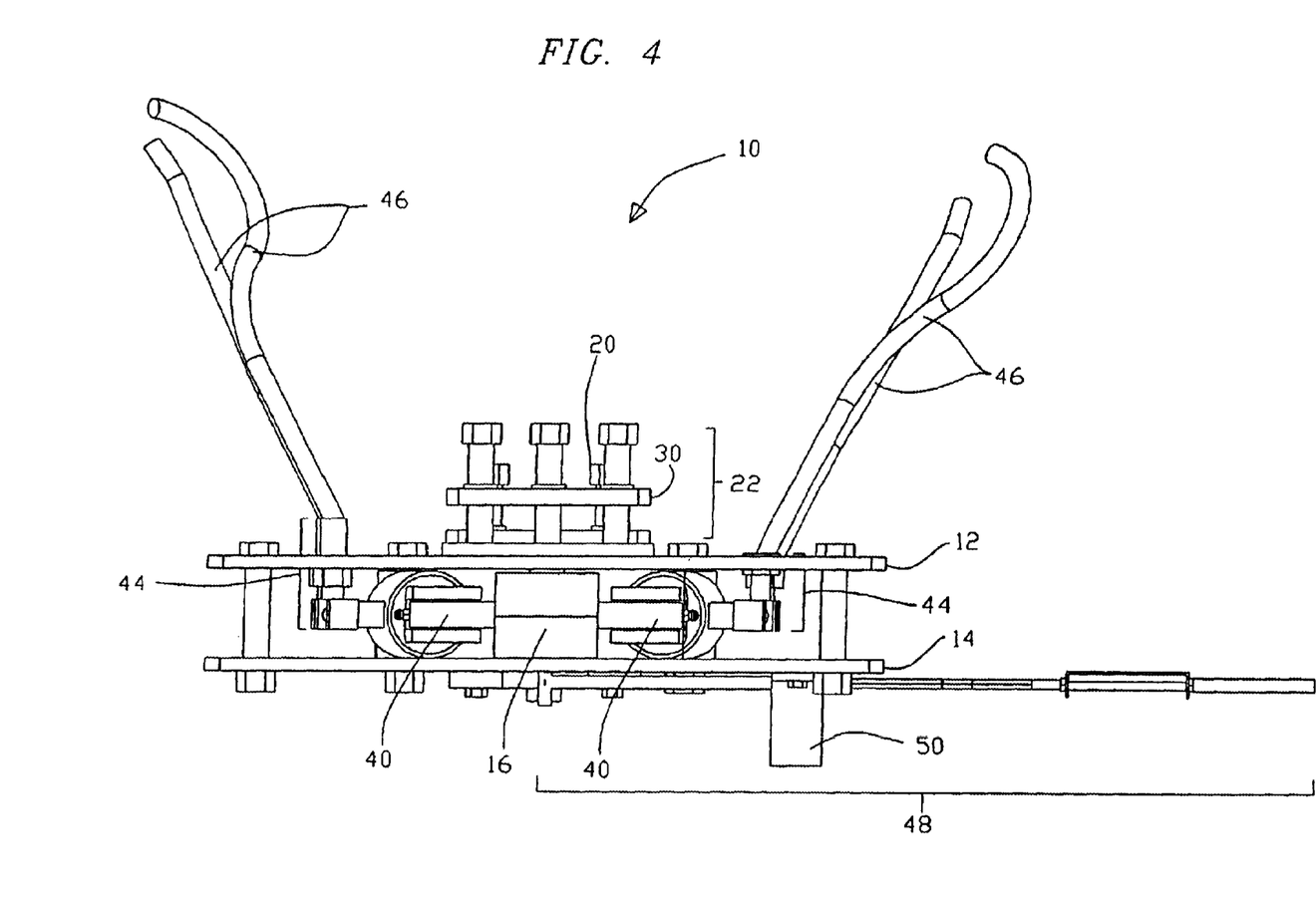
FIG. 4 is a rear elevational view as seen generally from line 4—4 in FIG. 1.
Figure 5:
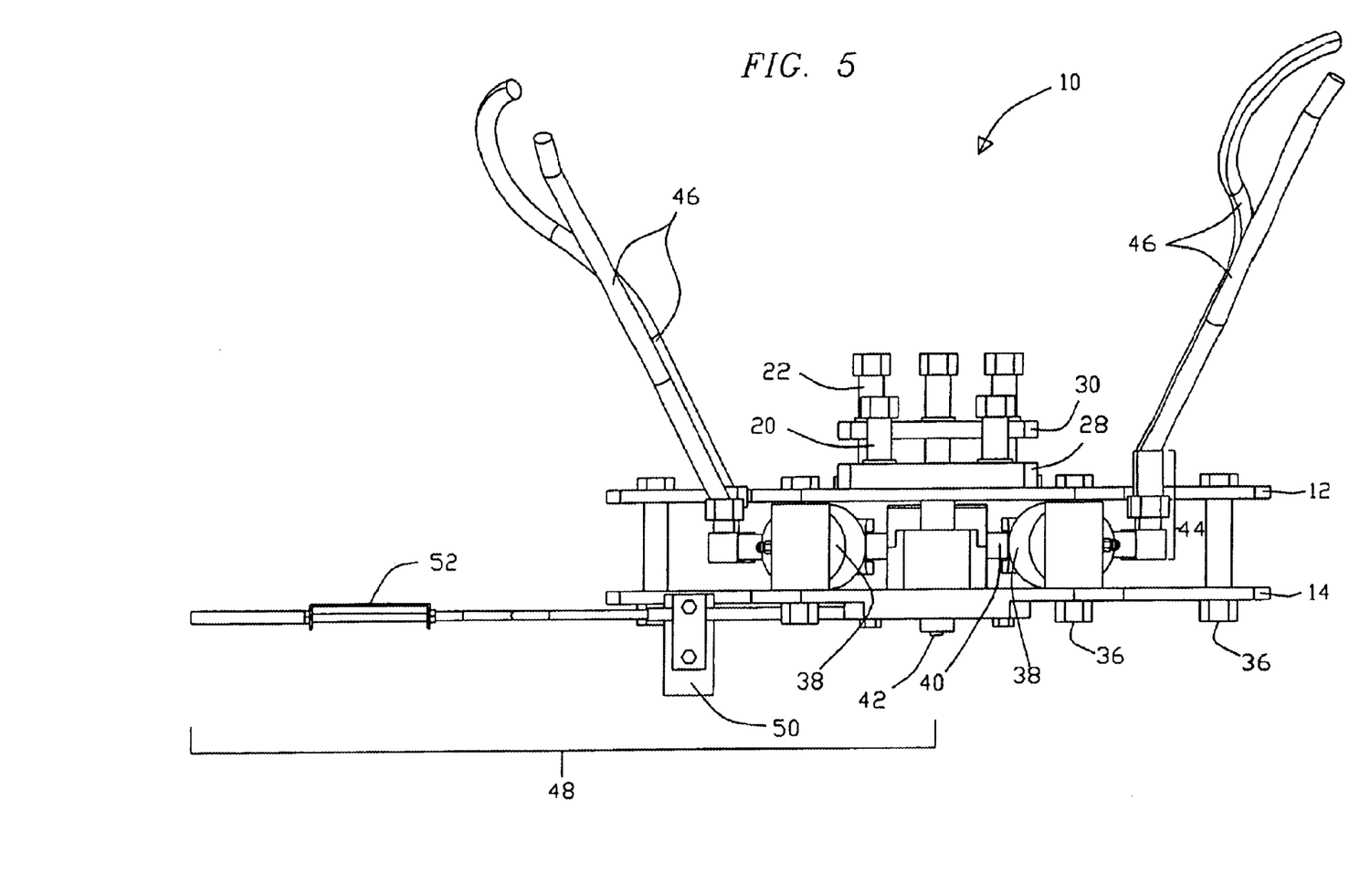
FIG. 5 is a front elevational view as seen generally from line 5—5 in FIG. 1.
Figure 6:
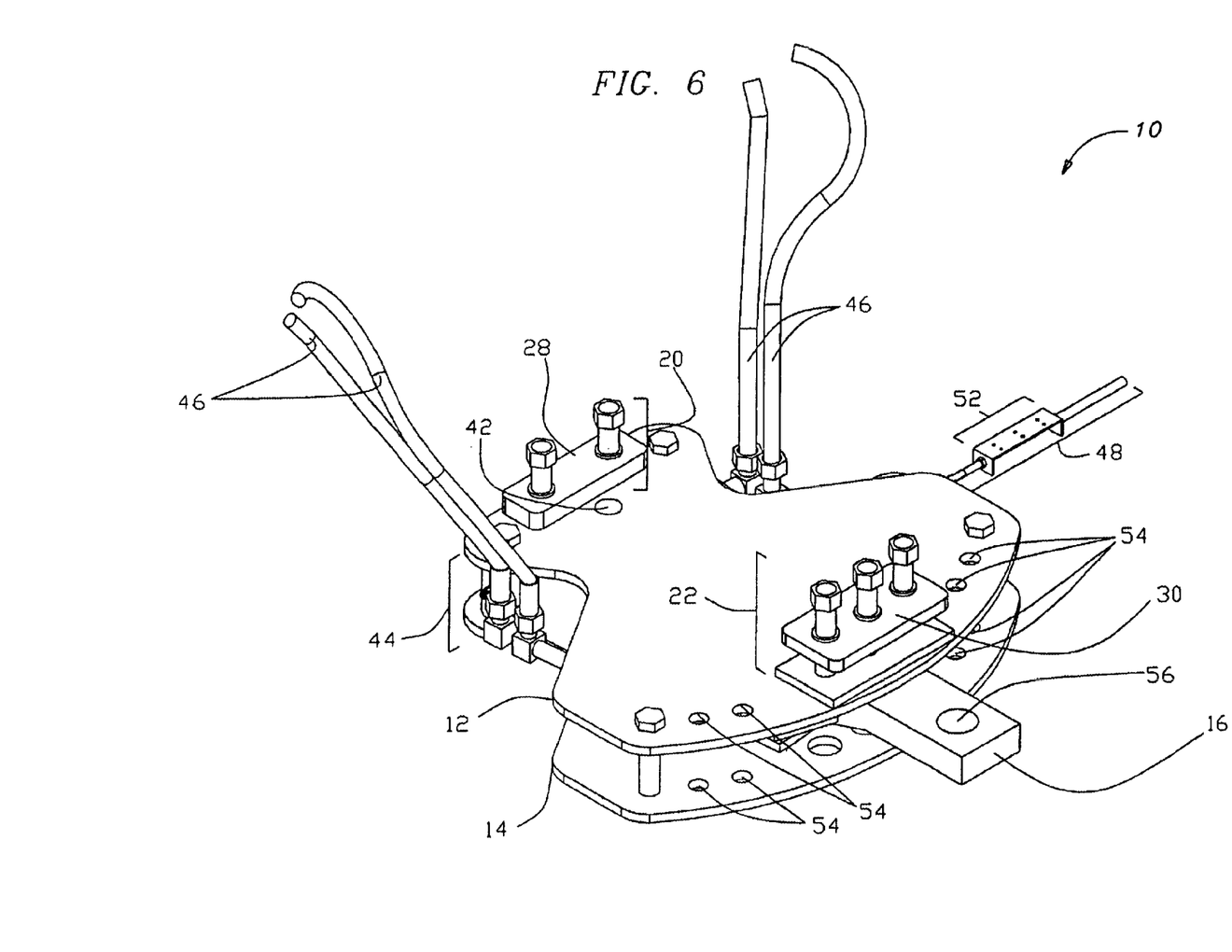
FIG. 6 is a perspective view of the assembly of FIG. 1.

As shown in the drawings, and referring in particular to FIG. 3, numeral 10 designates the adjustable drawbar assembly of the present invention. The assembly 10 generally comprises a top plate 12, a bottom plate 14, and an ancillary drawbar 16. Top plate 12 is adapted for releasable engagement with a tractor drawbar 18 (shown in phantom). Forward mounting posts 20 and rearward mounting posts 22 are provided for attaching assembly 10 to tractor drawbar 18 by releasably engaging top plate 12. In a preferred embodiment, posts 20 and 22 include threaded bolts 24 in threaded engagement with nut members 26. In an alternate preferred embodiment, the assembly 10 further comprises friction plates (not shown) releasably attached to the top and bottom segments of bar 16 that contact plates 12 and 14. In a preferred embodiment, the friction plates are constructed with an ultra-high molecular weight polyethylene compound.

Referring still to FIG. 3, forward mounting posts 20 further include forward spacer plate 28 and rearward mounting posts 22 further include rearward spacer plate 30. Spacer plates 28 and 30 are provided to support tractor drawbar 18 in receptive engagement with assembly 10. Forward plate bolts 32 and rearward plate bolts 34 are in threaded engagement with nuts 36. Bolts 32 and 34 are provided for attaching top plate 12 and bottom plate 14. Bolts 32 are further provided to fixedly engage a proximal end of actuators or hydraulic cylinders 38. A distal end of hydraulic cylinder 38 is pivotally attached to ancillary drawbar 16 at cylinder mounting plate 40. By extending and shortening the length of the cylinders 38, an operator can adjust the degree of desired offset of ancillary drawbar 16 to the left or right of a central axis substantially defined by tractor drawbar 18 about central pivot post 42.

Continuing to reference FIG. 3, hydraulic connectors 44 attach cylinders 38 to hydraulic fluid conduit 46 to provide hydraulic fluid to effectuate the movement of cylinders 38. A lateral adjustment element 48 is supported by bracket 50. Lateral adjustment element 48 is provided to manually adjust ancillary drawbar 16. In a preferred embodiment, integral transducer 58 provides a drawbar position feedback ("DPF") mechanism to an electric control box 60 (FIG. 7) to determine the relative position of cylinders 38. However, only one of the cylinders 38 is fitted with transducer 58 (Bobalee Hydraulics, Laurens, IA). In alternate embodiments, relative cylinder positions are determined by a plurality of proximity sensors, such as ultrasonic, ultraviolet, or laser proximity sensors (not shown) providing DPF signaling to control box 60. In a further alternate embodiment, relative cylinder position or drawbar position feedback is determined mechanically by a lever or other mechanical element (not shown) in physical communication with the cylinders 38 or drawbar 16.

Figure 1:
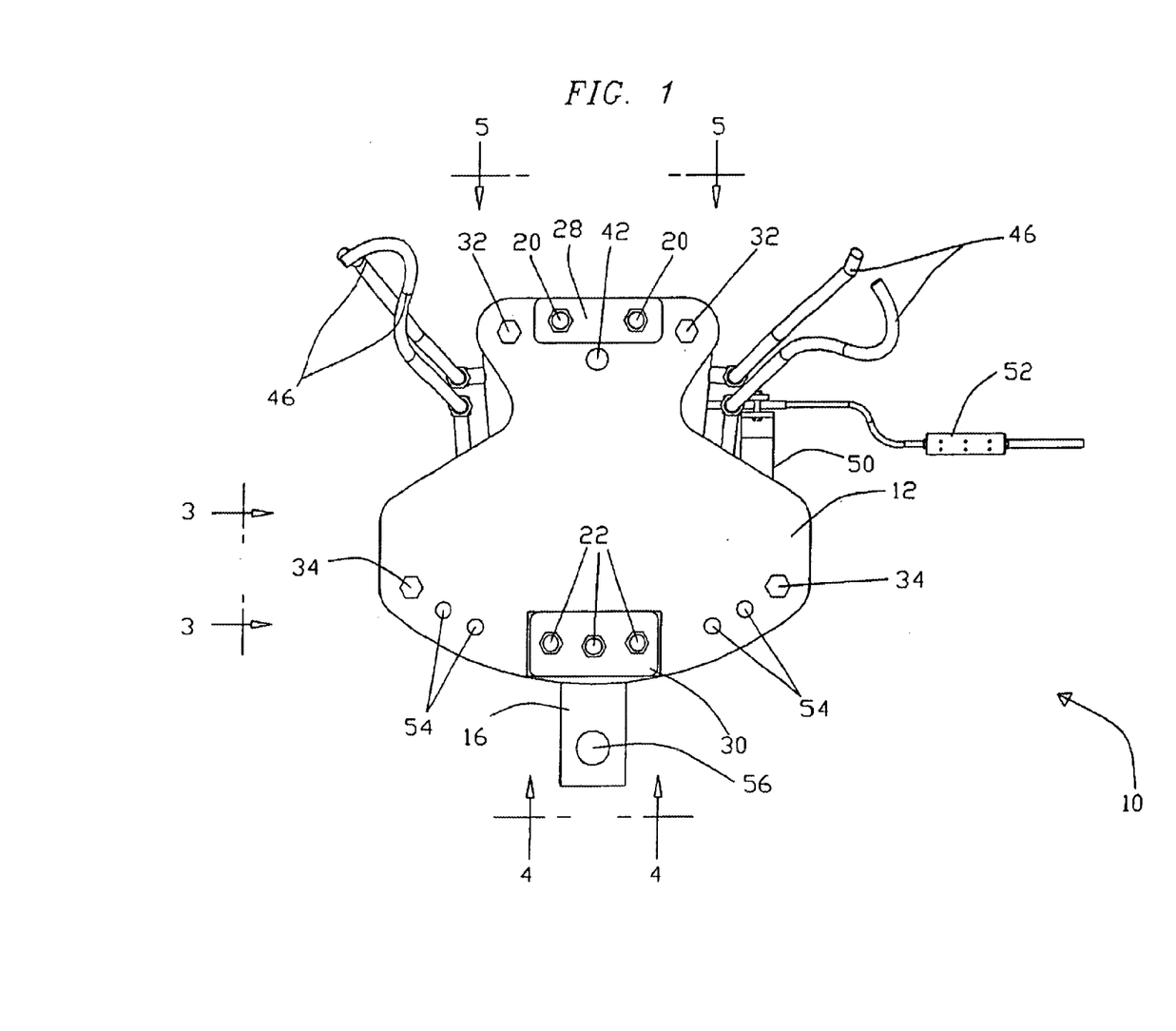
FIG. 1 is a top plan view of an adjustable drawbar offset assembly in accordance with the teachings of the present invention.
Figure 2:
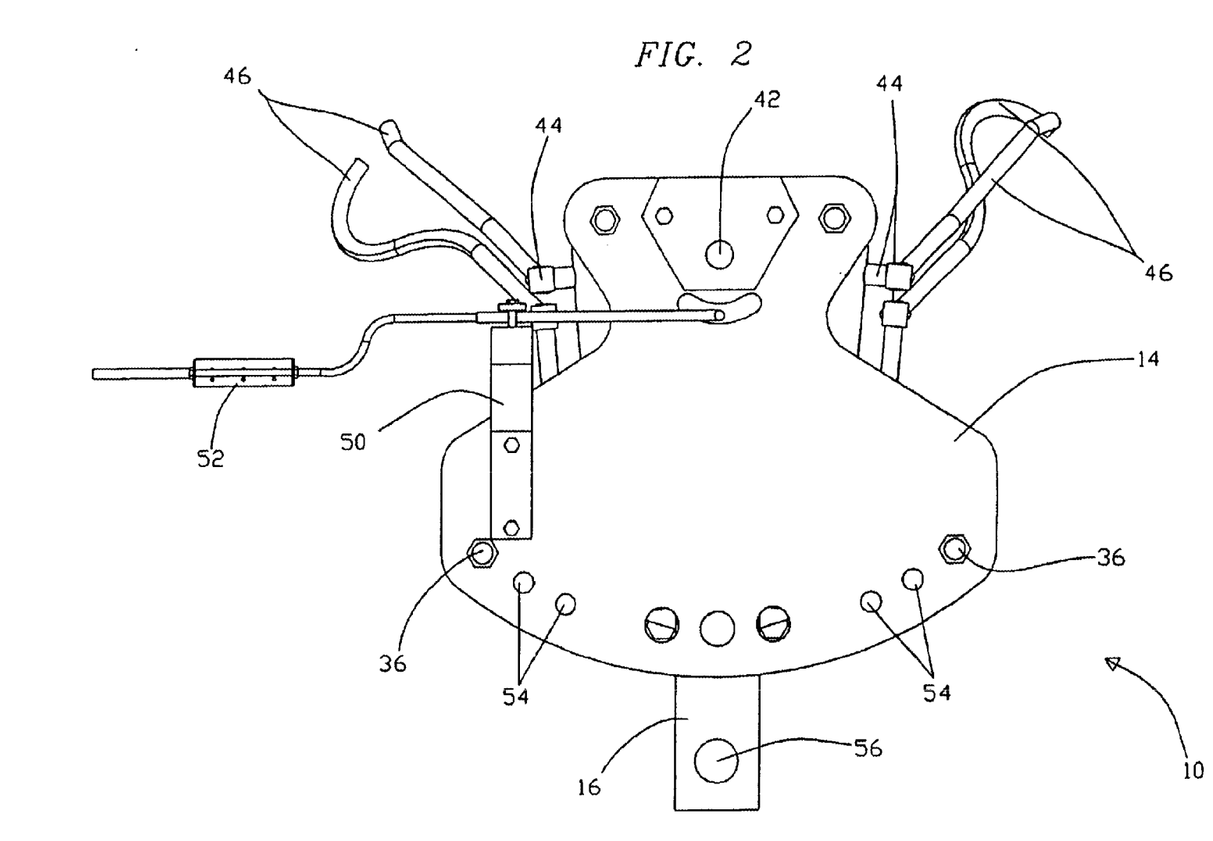
FIG. 2 is a bottom plan view of the assembly of FIG. 1.

Referring now to FIG. 1, lateral adjustment element 48 further includes a tension adjustment element 52. A plurality of holes 54 is provided to receive pins (not shown) that are inserted in holes 54 to define a maximum or limit offset position for the ancillary drawbar 16. Implement receiving member 56 is provided to releasably engage an implement in-tow (not shown).

Figure 7:
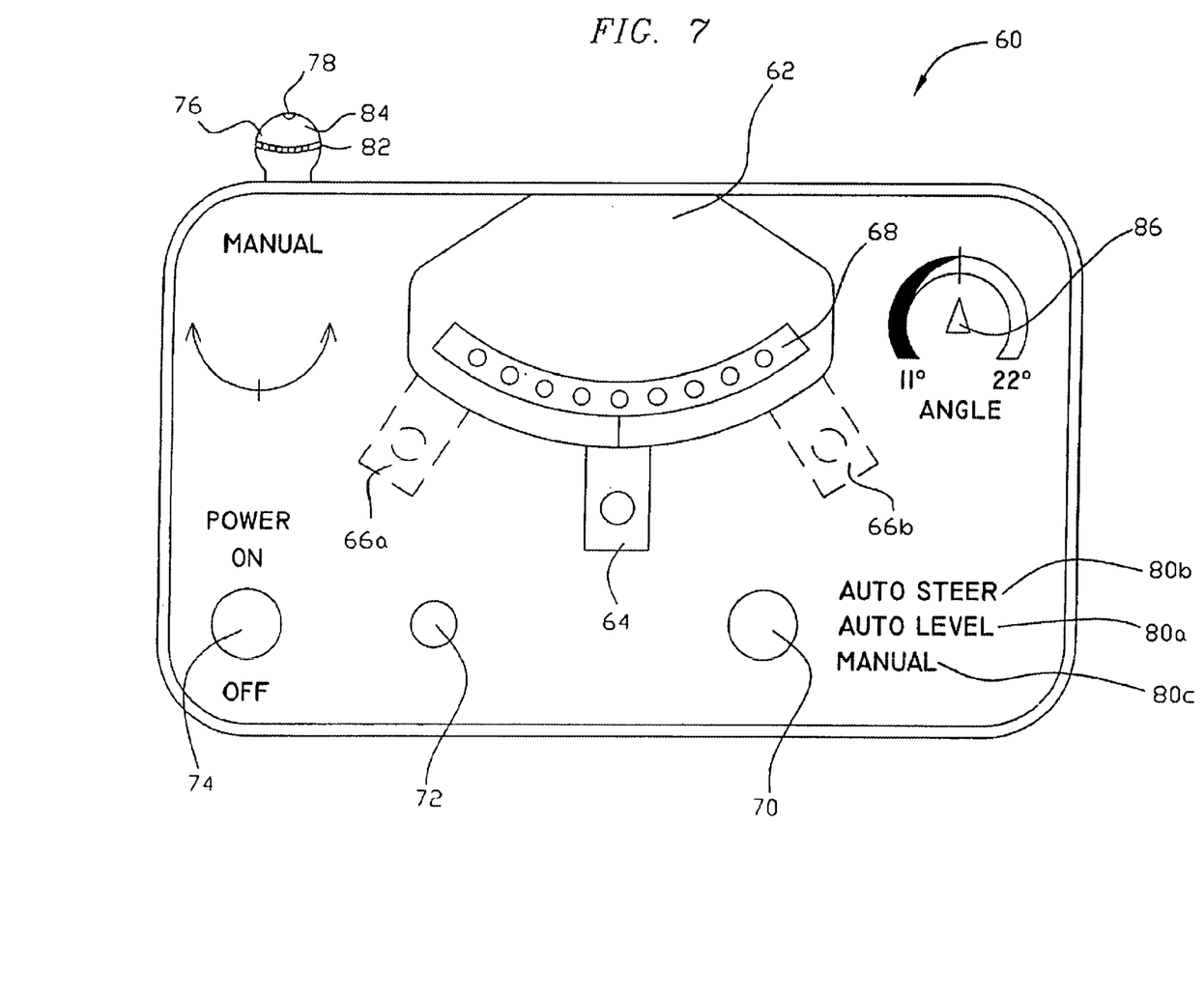
FIG. 7 is a top plan view of a control panel on an electronic control box that directs adjustment of the invention of FIG. 1.

FIG. 7 shows generally a control panel for the electronic control box ("ECB") 60 responsible for processing signals from a variety of sources and generating output to the cylinders 38. The ECB is typically located in a cabin of the towing vehicle within reach and plain view of the operator. Configured to operate in a plurality of modes, the ECB is designed to process an array of input signaling to adjust the position of drawbar 16. Drawbar graphic 62 is a pictorial representation of the drawbar 16 relative to top plate 12. Pictorial drawbar 64 is shown in the centered position, whereas pictorial drawbar 66a shows (in phantom) a leftwardmost drawbar position and pictorial drawbar 66b shows (in phantom) a rightwardmost drawbar position. One of a plurality of LED lights on drawbar position display 68 is illuminated to represent the approximate position of drawbar 16 relative to top plate 12 as depicted in a range of positions from a leftwardmost position 66a to a rightwardmost position 66b as displayed on graphic 62.

Referring still to FIG. 7, two-position toggle switch 74 turns the guidance system on and off. When the system is powered and "on," indicator bulb 72 is illuminated. Three-position toggle switch 70 determines the source of input signal supplying the ECB 60. When switch 70 is positioned in the "Auto Steer" mode 80b, the ECB receives a signal from a row-crop sensing device commonly known as "whiskers." When switch 70 is positioned in "Auto Level" mode 80a, the ECB receives a signal from a ground level sensor mounted to the vehicle (not shown). Input signals for auto leveling and auto steering are generated from an automatic implement position-relative ("AIPR") signal generator. In a preferred embodiment, a single axis tilt sensor is used (Crossbow Technology, Inc., San Jose, Calif.) to determine the grade or level of the ground and the tilt sensor is mounted inside the ECB 60. The Crossbow tilt sensor uses a micro-machined acceleration-sensing element with a DC response to measure inclination relative to gravity. Tilt sensor response depends on the magnitude of gravity parallel to the sensor element. The output of the tilt sensor is an offset voltage plus the voltage response proportional to the amount of gravity measured by the sensor. In a preferred embodiment, the voltage response of the tilt sensor is proportional to the sine of the tilt angle. Accurately measuring tilt angle is accomplished by solving the following equation: $\sin^{-1}((V_{out}-\text{Zero Angle Voltage})/\text{Sensitivity})$. For angles less than 20°, the sine function is approximated by a linear relationship between the $V_{out}$ and the tilt angle in radians. Thus, the equation for angle in degrees is as follows: $180/((V_{out}-\text{Zero Angle Voltage})/\text{Sensitivity})$. When the angle is less than 20°, the error from linear approximation is less than 1%. Alternate embodiments of the invention utilize tilt sensors or ground level sensors having fluid, electrolytic, and pendulum-based processing (not shown). Further alternate embodiments utilize ultrasonic-, photoelectric-, and laser-derived positional and proximity signaling (not shown) to generate command signals and/or a feedback signals. One example of an ultrasonic proximity sensor or switch utilizes sonar-reflected sound (Siemens Energy & Automation, Germany).

Positioning switch 70 in "Manual" mode 80c configures the system to act upon signals received from a hand-held or cabin-mounted control device (not shown). In a preferred embodiment, a hand-held toggle switch spring biased to the center is used. By toggling the switch in a leftward direction while in "Manual" mode, the drawbar 16 moves left. Upon release of the switch, the switch returns to the center position and the drawbar 16 follows-suit. By toggling the switch in a rightward direction while in "Manual" mode, the drawbar 16 moves right. Upon release of the switch, the switch returns to the center position and the drawbar 16 follows-suit. The position of the drawbar is observed directly or monitored by observing the illumination of one of a plurality of LED lights on drawbar position display 68 representing the approximate position of drawbar 16 relative to top plate 12 as depicted in a range of positions from a leftwardmost position 66a to a rightwardmost position 66b as displayed on graphic 62.

Continuing with reference to FIG. 7, calibration egg 76 is used to calibrate the guidance system when operating in Auto Level mode. In a preferred embodiment, egg 76 includes a locking member 82, a bullet level 78, and a floating ball 84. By rotating locking member 82 counterclockwise, the floating ball is free to rotate. Calibrating the guidance system in Auto Level mode requires parking the vehicle on a level surface. The equipment operator calibrates the tilt sensor by manipulating the floating ball until an arrow is aligned with the direction of travel, and the bullet level bubble indicates "level." Tightening locking member 82 in a clockwise rotation locks ball 84 in place and calibration is complete. Adjusting gain 86 to a plurality of positions between 11° and 22° enables an operator to approximate the grade on which the equipment is operating. Depending on the approximated slope and adjustment of gain 86, the ECB 60 will accelerate or decelerate the speed at which the drawbar 16 moves leftward or rightward of center. A restrictor plate in the closed hydraulic system of the present invention limits hydraulic fluid flow to 2 gal/min, resulting in drawbar movement to and from the center position to the leftwardmost or rightwardmost position at a maximum travel rate of around 2 to 3 seconds.

Figure 8:
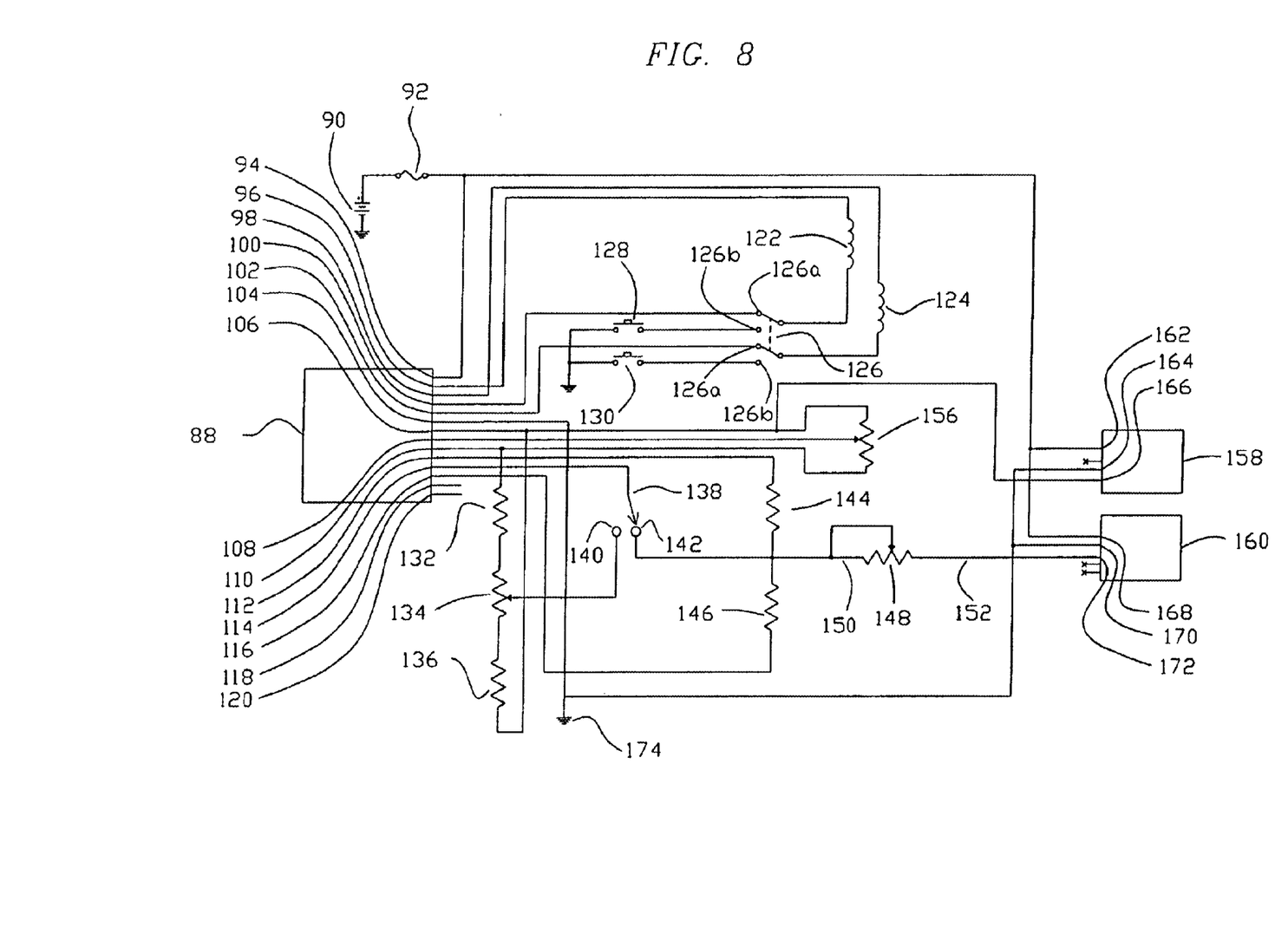
FIG. 8 is a wiring diagram of the electronic control box and cylinder feedback circuit of the present invention.

With reference to FIG. 8, electronic control box ("ECB") 88, in a preferred embodiment, comprises a dual coil comparator (High Country Tek, Nevada City, Calif.), which drives simple "on/off" valves to close the loop on two inputs. ECB 88 is powered from the battery 90 at power supply 94 and is grounded to ground 172 at power corn 104. Manual mode switch 138 overrides the automatic level and steering circuits when manual mode circuit 140 is closed. Likewise, when switch 138 is in the automatic position, automatic mode circuit 142 is closed. Generally, the ECB 88 drives coil A 122 when the control input [derived from coil A (+) 96 and coil A (−) 100] is greater than the cylinder feedback input [derived from cylinder feedback com 106, cylinder feedback voltage 108, and cylinder feedback reference voltage 110], and drives coil B 124 when the control input [derived from coil B (+) 98 and coil B (−) 102] is less than the cylinder feedback input [derived from cylinder feedback corn voltage 106, cylinder feedback voltage 108, and cylinder feedback reference voltage 110]. Auto steer switch 126 closes either auto level circuit 126a (position 80a in FIG. 7) or auto steer circuit 126b (position 80b in FIG. 7). When switch 126 is positioned for auto steer (position 80b in FIG. 7), it receives signal input from the whiskers at auto steer inputs 128, 130. When switch 126 is positioned for auto level (position 80a in FIG. 7), it receives signal input from X-axis voltage 172 of tilt sensor 160. Tilt sensor 160 is powered from the battery 90 at power supply 168 and is grounded at ground 170. X-axis voltage 172 from tilt sensor 160 reaches gain potentiometer (10 K ohm) 148 as 22° setting input 152 and compares it to 11° setting 150 to generate a "loop" signal to decelerate drawbar 16 movement when the 11° setting 150 is activated by gain 86 (FIG. 7) on ECB control panel 60 (FIG. 7).

Referring still to FIG. 8, in the automatic modes, cylinder feedback potentiometer 156 (5 K ohm POT, 1 K ohm/inch) relays cylinder feedback voltage 108 to feedback reference voltage 110 and cylinder feedback corn voltage 106. Cylinder feedback voltage 108 further signals voltage input 166 of the LED display 158 and illuminates LED light bar 68 (FIG. 7) to show the equipment operator a graphic representation of the position of drawbar 16 on ECB control panel 60 (FIG. 7). LED display 158 is powered from the battery 90 at power supply 162 and is grounded at signal corn 164. Command reference voltage 116 is applied across resistor D 144 (15 K ohm, ¼ watt, 5%) whereas command corn voltage 112 flows through resistor C 144 (15 K ohm, ¼ watt, 5%). When manual mode circuit is closed, manual override potentiometer (10 K ohm) 134 relays a signal from command voltage 114 through resistors A and B, 132, 136 (1.5 K ohm, ¼ watt, 5%) returning to the ECB 88 at feedback reference voltage 110 and feedback com voltage 106. When automatic mode circuit is closed, signals from command voltage 114 flow through switch 138 through resistors C and D, 144, 146 (15 K ohm, ¼ watt, 5%) returning to the ECB 88 at command corn voltage 112 and command reference voltage 116. Error indicators 118 120 can be configured to detect out of range inputs or an open or shorted valve coil.

The ECB 88 further comprises a serial communications port (not shown) for customizing the individual parameters with a PC using configuration software. In a preferred embodiment, smart cylinder solenoid valves (Command Control Corp., Elgin, Ill.) are three-way, two position, spool type, direct acting, solenoid operated, directional control valves (not shown), and load holding valves (Command Control Corp., Elgin, Ill.) are direct acting, screw in cartridge style, poppet type, adjustable, pilot assisted, hydraulic counterbalance valves. In an alternate preferred embodiment, both cylinders are standard hydraulic cylinders and drawbar position feedback ("DPF") is attained through an alternate means (switches or sensors utilizing ultrasonic-, photoelectric-, and laser-derived positional and proximity signaling to generate a feedback signal) (not shown).

The foregoing description and drawings comprise illustrative embodiments of the present inventions. The foregoing embodiments described herein may vary based on the ability, experience, and preference of those skilled in the art. The foregoing description and drawings merely explain and illustrate the invention, and the invention is not limited thereto. Those skilled in the art who have the disclosure before them will be able to make modifications and variations therein without departing from the scope of the invention.

I claim:

1. In combination with an implement and a towing vehicle having a towing vehicle drawbar, the improvement of an implement guidance system attaching the towing vehicle drawbar to the implement in a towing relationship, which system comprises:

a mounting apparatus including a fastening assembly fixedly fastening the mounting apparatus on the towing vehicle drawbar;

an ancillary drawbar including a front end pivotally mounted on the mounting apparatus and a back end, said ancillary drawbar being pivotally movable between right and left side positions offset to either side of the mounting apparatus;

said ancillary drawbar back end being pivotally attached to the implement;

a signal generator generating a signal to move the ancillary drawbar position with respect to said mounting apparatus to a plurality of positions offset to either side of the mounting apparatus; and an actuator including a first end connected to the mounting apparatus and a second end connected to the ancillary drawbar, said actuator responding to the signal for moving the drawbar to the plurality of offset positions.

2. The implement guidance system of claim 1 wherein the signal generator is an operator-supplied manually-derived signal.

3. The implement guidance system of claim 1 wherein the signal generator is an automatic implement position-relative ("AIPR") signal generator.

4. An implement guidance system for manipulating the angular positioning of a drawbar of a towing vehicle for towing an implement attached to the towing vehicle comprising:

a mounting apparatus secured to the towing vehicle;

a drawbar mounted on the mounting apparatus for movement to a plurality of positions offset to either side of the mounting apparatus;

an automatic implement position-relative ("AIPR") signal generator for generating a signal to manipulate the drawbar position;

an actuator connected to the mounting apparatus and the drawbar and responsive to the signal for moving the drawbar to the plurality of offset positions; and a drawbar position feedback ("DPF") signal generator, wherein the AIPR signal generator is in electronic communication with the actuator, and in further electronic communication with the DPF signal generator, comprising a system capable of automatically determining the position of an implement relative to its working environment and moving the drawbar relative thereto.

5. The implement guidance system of claim 4 wherein the AIPR signal generator is a ground level sensor.

6. The implement guidance system of claim 4 wherein the AIPR is a whiskers row-crop sensing signal generator.

7. The implement guidance system of claim 4 wherein the DPF signal generator is a smart cylinder.

8. The implement guidance system of claim 4 wherein the DPF signal generator is a proximity sensor.

9. In combination with an implement and a towing vehicle having a towing vehicle drawbar, the improvement of an implement guidance system attaching the towing vehicle drawbar to the implement in a towing relationship, which system comprises:

a mounting apparatus including: a fastening assembly fixedly fastening the mounting apparatus on the towing vehicle drawbar; a top plate mounting the fastening assembly; and a bottom plate attached to and depending from said top plate in spaced relation below same;

an ancillary drawbar including a front end located between and pivotally mounted on said top and bottom plates and a back end, said ancillary drawbar being pivotally movable between right and left side positions offset to either side of the mounting apparatus;

said ancillary drawbar back end being pivotally attached to the implement;

a signal generator generating a signal to move the ancillary drawbar position with respect to said mounting apparatus to a plurality of positions offset to either side of the mounting apparatus; and an actuator including a first end connected to the mounting apparatus and a second end connected to the ancillary drawbar, said actuator responding to the signal for moving the drawbar to the plurality of offset positions.

10. The implement guidance system of claim 9 wherein the signal generator is an operator-supplied manually-derived signal.

11. The implement guidance system of claim 9 wherein the signal generator is an automatic implement position-relative ("AIPR") signal generator.

12. The implement guidance system of claim 11 further comprising a drawbar position feedback ("DPF") signal generator, wherein the AIPR signal generator is in electronic communication with the actuator, and in further electronic communication with the DPF signal generator, comprising a system capable of automatically determining the position of an implement relative to its working environment and moving the drawbar relative thereto.

13. The implement guidance system of claim 12 wherein the AIPR signal generator is a ground level sensor.

14. The implement guidance system of claim 12 wherein the AIPR is a whiskers row-crop sensing signal generator.

15. The implement guidance system of claim 12 wherein the DPF signal generator is a smart cylinder.

16. The implement guidance system of claim 12 wherein the DPF signal generator is a proximity sensor.

17. An implement guidance system for manipulating the angular positioning of a drawbar of a towing vehicle for towing an implement attached to the towing vehicle comprising:

a mounting apparatus secured to the towing vehicle;

a drawbar mounted on the mounting apparatus for movement to a plurality of positions offset to either side of the mounting apparatus;

a signal generating means for generating a signal to manipulate the drawbar position;

an actuator responsive to the signal for moving the drawbar to the plurality of offset positions; and a draw bar position feedback means, wherein the signal generating means is in electronic communication with the actuator, and in further electronic communication with the drawbar position feedback means, comprising a system capable of automatically determining the position of an implement relative to its working environment and moving the drawbar relative thereto.

18. The implement guidance system of claim 17 wherein the signal generating means is a ground level sensor.

19. The implement guidance system of claim 17 wherein the signal generating means is a whiskers row-crop sensing signal generator.

20. The implement guidance system of claim 17 wherein the drawbar position feedback means comprises a signal generator capable of determining the position of the drawbar.

* * * * *